(12) United States Patent
Naud et al.

(10) Patent No.: US 7,066,639 B2
(45) Date of Patent: Jun. 27, 2006

(54) MACHINE TOOL FOR PROCESSING FOOD PRODUCTS, HAVING IMPROVED LATCHING MEANS, AND MACHINE EQUIPPED WITH SUCH A TOOL

(75) Inventors: Georges Naud, Aubusson (FR); Christophe Lagier, Aubusson (FR); Bruno Paturel, Aubusson (FR)

(73) Assignee: Dito Sama, Aubusson (FR)

( * ) Notice: Subject to any disclaimer, the term of this patent is extended or adjusted under 35 U.S.C. 154(b) by 117 days.

(21) Appl. No.: 10/841,631

(22) Filed: May 10, 2004

(65) Prior Publication Data

US 2004/0222326 A1 Nov. 11, 2004

(30) Foreign Application Priority Data

May 9, 2003 (FR) .................................. 03 05634

(51) Int. Cl.
*A47J 43/044* (2006.01)
*A47J 43/07* (2006.01)

(52) U.S. Cl. ........................................ 366/129; 99/348

(58) Field of Classification Search .................. 99/348, 99/485; 366/129, 130, 347–349, 207, 342, 366/343; 241/168, 169, 169.1, 285.2, 285.3; 416/244 R, 63
See application file for complete search history.

(56) References Cited

U.S. PATENT DOCUMENTS

| | | | | |
|---|---|---|---|---|
| 2,805,050 | A | * | 9/1957 | Ghislain Choppinet ...... 99/348 |
| 3,299,924 | A | * | 1/1967 | Hanschitz ..................... 99/348 |
| 4,405,998 | A | * | 9/1983 | Brison ........................ 366/264 |
| 5,368,384 | A | * | 11/1994 | Duncan et al. ............. 366/129 |
| 5,567,047 | A |   | 10/1996 | Fritsch |
| 5,836,684 | A | * | 11/1998 | Safont et al. ................ 366/129 |
| 5,863,118 | A | * | 1/1999 | Ackels et al. .................. 99/348 |
| 6,193,404 | B1 | * | 2/2001 | Calange ........................ 99/348 |
| 6,293,691 | B1 | * | 9/2001 | Rebordosa et al. ......... 366/129 |
| 6,325,532 | B1 | * | 12/2001 | King et al. .................... 99/348 |
| 6,398,403 | B1 | * | 6/2002 | Rebordosa et al. ......... 366/129 |
| 2002/0136086 | A1 |   | 9/2002 | Gili et al. |

FOREIGN PATENT DOCUMENTS

DE 200 06 028 U1 7/2000

* cited by examiner

*Primary Examiner*—Timothy F. Simone
(74) *Attorney, Agent, or Firm*—Sughrue Mion, PLLC

(57) ABSTRACT

A tool for use in a food processing machine. This tool has a cover tube (11) and a shaft (13) for driving in rotation a member for processing food products, which shaft is mounted in the cover tube (11), the cover tube (11) being provided at a first end with a mechanism (21, 25) for latching onto a machine body (3). The mechanism (21, 25) for latching the cover tube (11) onto the machine body (3) has at the first end, at least one flexible axial resilient arm (21) provided with a hook (25) which can cooperate with a complementary shoulder (33) of the machine body in such a manner as to form a snap-in connection. Also, a machine for processing food products and containing such a tool.

8 Claims, 3 Drawing Sheets

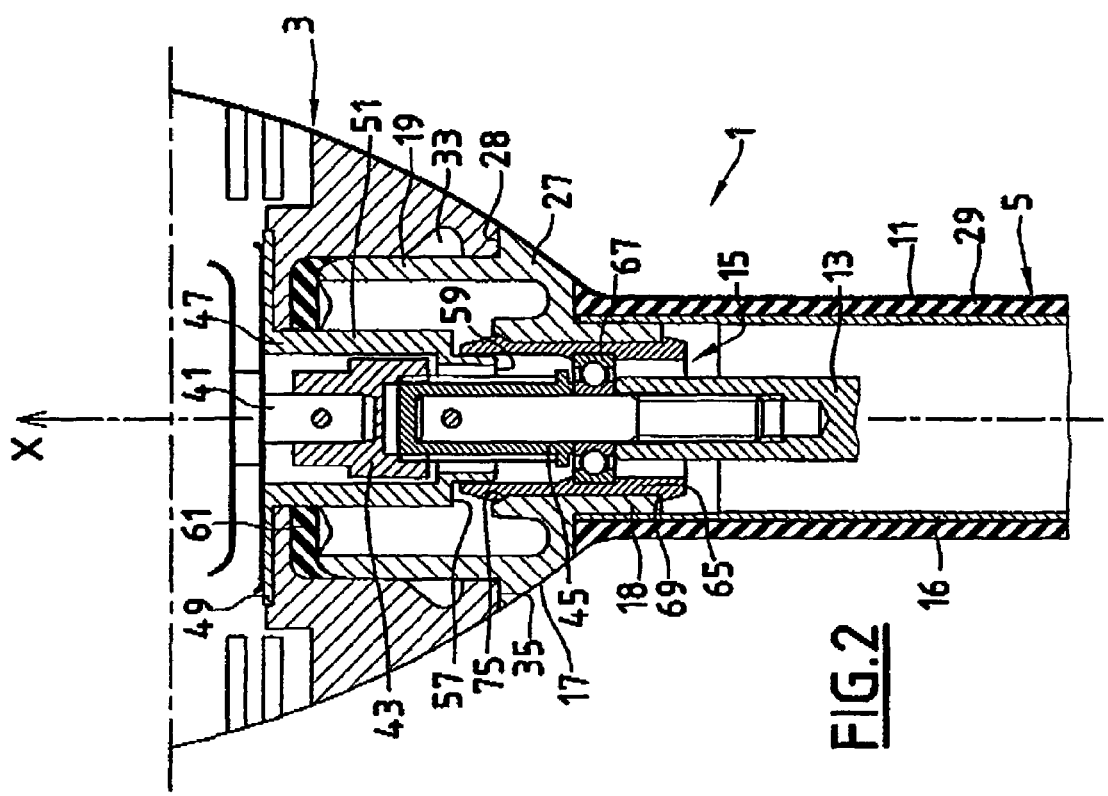
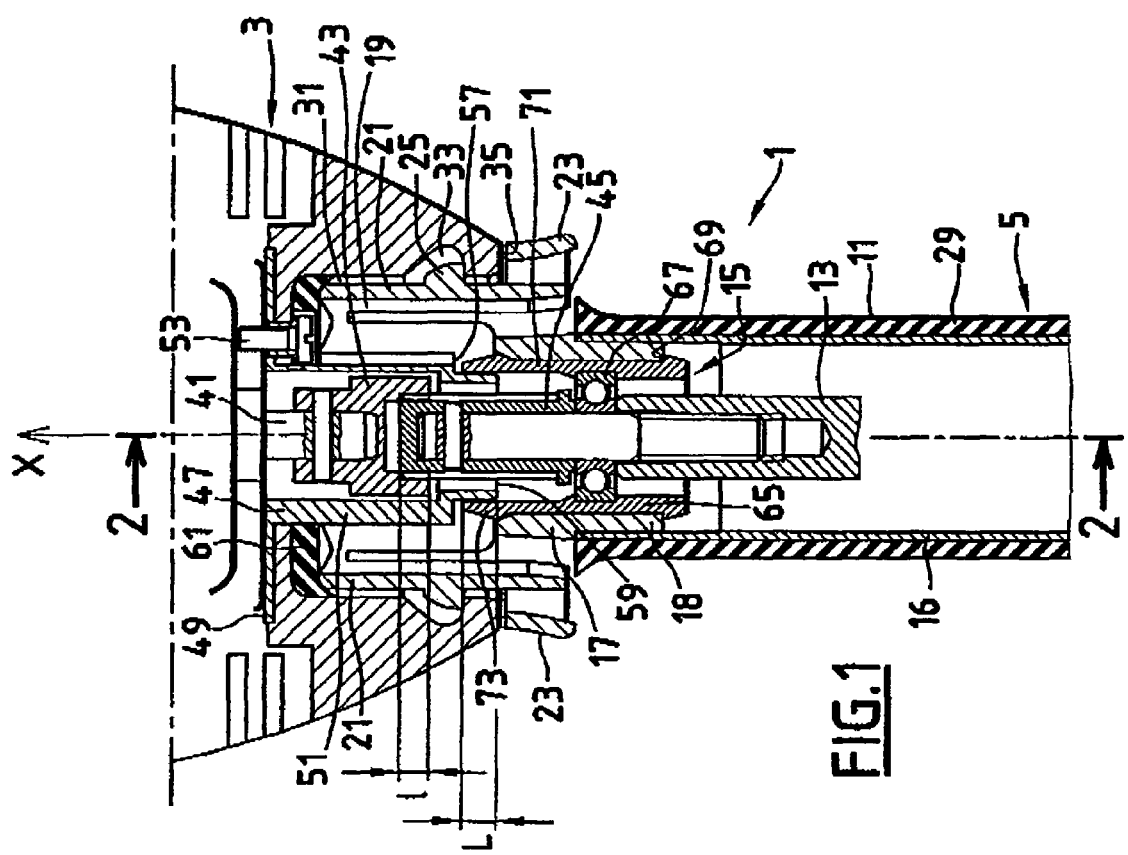

MACHINE TOOL FOR PROCESSING FOOD PRODUCTS, HAVING IMPROVED LATCHING MEANS, AND MACHINE EQUIPPED WITH SUCH A TOOL

FIELD OF INVENTION

A machine tool for processing food products, having improved latching means, and a machine equipped with such a tool

BACKGROUND TO THE INVENTION

The present invention relates to a machine tool for processing food products, comprising
  a cover tube, and
  a shaft for driving in rotation a member for processing the products, which shaft is mounted in the cover tube,
  the cover tube being provided at a first end with dismountable means for latching onto a machine body.

Generally, the dismountable means for latching onto the machine body are constituted by screwing means or bayonet means.

It has been observed on existing machines that the screwing means, which exhibit excellent operating reliability since they generally avoid any accidental dismounting of the tool in the course of its operation, are relatively expensive to manufacture and are difficult to clean when the tool is clogged up.

Bayonet devices are less expensive to manufacture but in general exhibit a low degree of precision so that they are often subject to jamming, making it difficult to dismount them. In addition, the mounting and dismounting operations require a great deal of attention and effort when the bayonet devices are used to equip industrial food reparation machines. In particular, the bayonet latching means of the type known in this field do not enable the tool to be mounted blind on the machine, which is a major disadvantage for relatively large machines because such machines cannot be readily moved or oriented by the user in order to mount the tool.

SUMMARY OF THE INVENTION

The object of the invention is to propose a tool of the above-mentioned type which offers great ease of mounting on the associated machine and great reliability in the sense that the risk of accidental dismounting is minimised, and in which the latching means do not represent high manufacturing costs.

To that end, according to the invention, the means for latching the cover tube onto the machine body comprise, at the first end, at least one flexible axial resilient arm provided with a hook which can cooperate with a complementary shoulder of the machine body in such a manner as to form a snap-in connection.

According to other features of the invention:
  the cover tube has, at the first end, a plurality of axial projections distributed in a peripheral manner;
  the axial projections are constituted by undulations formed on the first end portion of the cover tube;
  the means for latching the cover tube onto the machine body comprise a pair of diametrically opposed axial resilient arms;
  the cover tube comprises a main tube, and an end-piece secured in a non-dismountable manner to one end of the main tube, the end-piece being provided with the means for latching the cover tube onto the machine body; and
  the main tube is produced from metal and the end-piece is produced from plastics material.

The invention is also directed to a machine for processing food products, comprising a tool such as described above and a machine body to which the tool is secured in a dismountable manner, the body comprising an axial bore which is to receive a first end portion of the cover tube, and the bore being provided with a shoulder complementary with the hook.

According to other features of the machine according to the invention:
  the machine comprises a block of resilient material interposed between the base of the bore and the first end of the cover tube when the cover tube is latched onto the body, the block having a bearing face for the first end of the cover tube, the face having axial recesses which are substantially complementary with the axial projections of the cover tube;
  the block is of a cylindrical general shape, one of the end faces having axial undulations which are complementary with those of the cover tube and which define the axial recesses;
  the block is arranged to be deformed in compression during the snapping-in of the latching means on the machine body; and
  the shoulder is defined by an annular groove leading into the bore.

BRIEF DESCRIPTION OF DRAWINGS

A particular embodiment of the invention will now be described in more detail with reference to the appended drawings in which:

FIG. 1 is a partial sectioned view of a machine according to the invention, in an axial longitudinal plane, the tool being in a position of complete assembly on the machine body;

FIG. 2 is an analogous view, in the plane marked by the line 2—2 in FIG. 1;

DESCRIPTION OF PREFERRED EMBODIMENT

Figure 3:
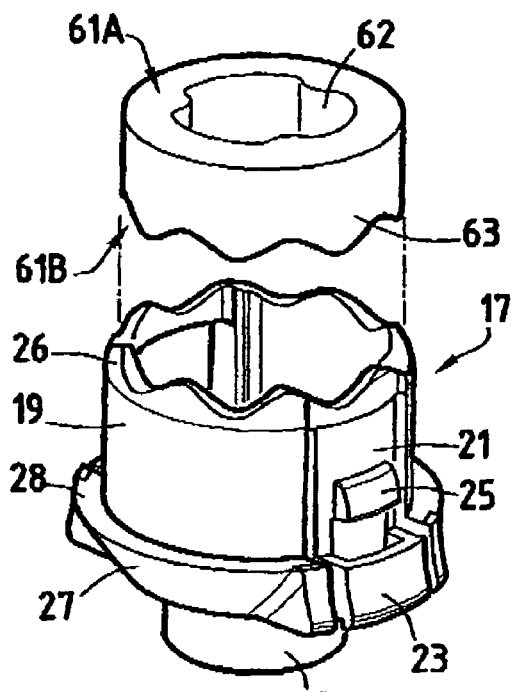
FIG. 3 is a perspective view of the end-piece for securing the tool to the machine body, and of the elastomeric block.

FIGS. 1 and 2 show a machine 1 according to the invention, of the type commonly called "mixers", the machine comprising a body 3 in which an electrical motor (not shown) is arranged, and a tool 5 for processing food products.

The tool 5 comprises a member for processing products, such as a blade or knife which can be driven in rotation by the motor of the machine in accordance with an axis of rotation X which defines the axis of the machine 1.

The machine represented in the Figures in order to illustrate the invention is generally used with its axis X maintained in a vertical position, the tool 5 dipping into a receptacle containing the food products to be processed. That is why, in order to facilitate the following description, the axis X of the machine 1 will be assumed to be vertical and oriented from the bottom to the top relative to the normal position of use of the machine.

The tool 5 basically comprises a cover tube 11 having a substantially cylindrical general shape, and a shaft 13 for driving the food processing member in rotation. The processing member secured to the drive shaft 13 at a lower end portion thereof has not been shown. It is generally protected by a bell which belongs to the tool and which is fixedly joined to the cover tube, the bell likewise not being shown.

The drive shaft 13 is mounted rotatably in a coaxial and dismountable manner inside the cover tube 11. For that purpose, the tool 5 is provided with means for centering and guiding the drive shaft 13 inside the tube 11.

The centering and guiding means comprise, in particular, a rolling bearing 15 mounted on the drive shaft 13 in an upper end region thereof. The bearing 15, as will be seen hereinafter, is provided with dismountable means for securing inside the tube 11, which cooperate with complementary means provided at the upper end of the tube 11. The bearing 15 provides, at the respective upper ends of the tube 11 and the shaft 13, a pivot link with axial stoppage of the shaft 13 on the tube 11, this link being detachable.

The centering and guiding means may also comprise a second rolling bearing (not shown) which is fixedly joined to the shaft 13 in a lower end region, the bearing being able to be arrested axially on an internal shoulder of the tube 11.

The cover tube 11 comprises a main tube 16 which is preferably produced from metal and which extends along most of the length of the cover tube, and an end-piece 17 which is secured in a non-dismountable manner to the upper end of the main tube 16 and which ensures the dismountable securing of the cover tube 11 to the machine body 3.

Reference may now be made to FIGS. 1 to 3 for the detailed description of the end-piece 17.

The end-piece 17, which is preferably produced from plastics material, is basically composed of a first cylindrical portion 18 and a second cylindrical portion 19 of larger diameter. The end-piece 17 is mounted coaxially on the main tube 16 by fitting in the latter the first cylindrical portion 18, the outside diameter of which is adjusted to the inside diameter of the main tube 16.

The second cylindrical portion 19 projects axially and radially from the main tube 16. The portion 19 carries dismountable means for securing the cover tube 11 to the machine body 3, in the form of a pair of resilient arms 21 extending axially and symmetrically one opposite the other relative to an axial plane. Each arm 21 cuts into the peripheral wall of the second portion 19, being attached to that wall by its upper end, which defines a bending hinge of the arm 21. The lower end of the arm 21 is free and supports a radially projecting control button 23. In an intermediate region, each arm 21 is provided with a radially projecting stud 25 forming a latching hook.

On its peripheral edge at the free end, the portion 19 has undulations generated by a sinusoid which extends peripherally, the undulations defining an alternation of axial troughs and projections 26.

The end-piece 17 also has a frustoconical collar 27 in a transition region between the cylindrical portions 18, 19, the base 28 of larger diameter of which frustoconical collar 27 extends peripherally at the base of the second portion 19, defining an annular shoulder which is provided in order to limit the axial engagement of the cover tube 11 in the machine body 3.

The non-dismountable rigid connection between the main tube 16 and the end-piece 17 is secured by a sleeve 29 having a cylindrical general shape which extends from the collar 27 around the main tube 16 over a portion of its length. The sleeve 29, which is preferably produced from plastics material, may define a gripping handle of the tool 5. It may be formed, for example, by moulding plastics material over the previously assembled main tube 16 and end-piece 17.

Referring again to FIGS. 1 and 2, a description will now be given more especially of the portion of the machine body 3 in which the tool 5 is received.

The body 3 has an axial bore 31 opening Out on the lower side of the machine body 3. The bore 31 is of a substantially cylindrical general shape suitable for receiving with axial engagement the first portion 19 of the end-piece 17. Leading into the bore 31 is an annular groove 33 which defines a stop notch complementary with the hooks 25. The machine body 3 also has a lower face at which the bore 31 opens out, that face being provided with an annular rim 35 forming a stop for the shoulder 28 of the tool.

The motor shaft 41 of the machine projects axially into the bore 31 from the base thereof. The motor shaft 41 is provided at its free end with a drive form 43, which is connected in rotation and which can be coupled in a disengageable manner to a complementary drive form 45 provided at the upper end of the drive shaft 13 of the tool. The disengageable coupling of the two drive forms 43, 45 may, for example, be provided by complementary axial ribs and grooves.

Figure 4:
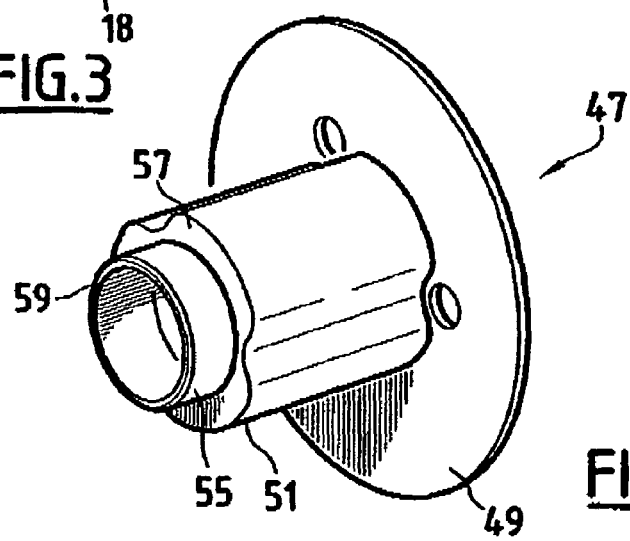
FIG. 4 is a perspective view of the means for locking the centering and guiding member.

The machine body 3 is fixedly joined to a locking and detecting member 47 which is shown only in FIG. 4.

The locking and detecting member 47 is basically composed of a plate 49 for securing to the body 3, and of a central socket 51 which is substantially cylindrical and has an axis at right-angles to the plate. The plate 49 is fixed rigidly to the body 3 at the base of the bore 31 by means of screws 53. The plate 49 has an annular shape with a central bore through which the motor shaft 41 extends. The socket 51 projects into the bore 31, completely surrounding the drive form 43. A coaxial cylindrical wall 55 of smaller diameter is formed at the lower end of the socket and defines at its base a substantially annular shoulder 57 and at its free end a stop edge 59.

In the example shown, the base of the bore 31, around the socket 51, is covered by an elastomeric block 61 fixedly joined to the body 3.

Figure 5:
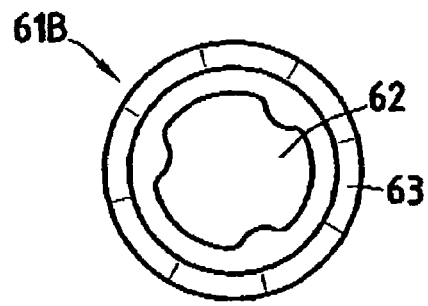
FIG. 5 is a plan view of the undulating face of the elastomeric block.

Referring now to FIGS. 3 and 5, a more precise description will be given of the elastomeric block or cover 61. The latter has a cylindrical general outer shape complementary with the axial inner wall of the bore 31. It is formed with an axial central bore 62 complementary with the socket 51 and is suitable for being locked in rotation on the socket. In the example shown, the elastomeric block 61 is locked in rotation on the member 47 by the mutual engagement of radial projections and notches formed in the bore 62 and on the socket 51, respectively.

A first base face 61A of the elastomeric block 61 is substantially flat in order to provide flat bearing on the base of the bore 31, while the other base face 61B of the block 61, which cooperates with the end-piece portion 19, has a sinusoidal undulation 63 corresponding to the undulation 26 of the portion 19. The undulation 63 is formed on a peripheral border of the face 61B, over a width which is, for example, equal to or slightly larger than the wall thickness of the end-piece portion 19.

Figure 6:
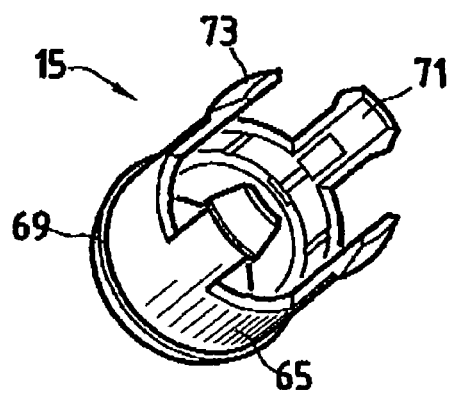
FIG. 6 is a partial perspective view of the centering and guiding member.

A more detailed description will now be given of the bearing 15 with reference to FIGS. 1, 2 and 6.

The bearing 15 basically comprises a substantially cylindrical ring 65 of plastics material, a rolling bearing 67 (not shown in FIG. 6), for example a ball bearing, arranged inside the ring 65, and releasable means for securing the bearing 15 inside the cover tube 11.

The ring 65 has outside dimensions adjusted to the inside dimension of the first cylindrical portion 18 of the end-piece 17, so that the bearing can be inserted axially, without radial clearance, inside the portion 18.

The releasable means for securing the bearing 15 comprise, at the lower end of the ring 65, an annular collar 69 defining, with the lower edge of the portion 18, an axial stop in a first direction, and flexible tongues 71 which are integral with the ring 65 and which project axially upwards from that ring. Each flexible tongue has at its free end a hook 73 which projects radially towards the outside. The hooks 73 define, with a frustoconical internal surface 75 flared towards the top of the portion 18, an axial stop in the second direction of the bearing 15 relative to the cover tube 11.

It will be readily appreciated how the drive shaft 13 is mounted inside the cover tube 11 by means of the bearing 15: the bearing 15 being fixedly joined to the drive shaft 13, and the end-piece 17 being fixed rigidly to the main tube 16, the drive shaft 13 and its bearing 15 are inserted into the cover tube 11 and they are caused to slide towards the top until the flexible tongues 71 come into contact with the lower edge of the portion 18. Continuing the insertion movement, the tongues 71 bend resiliently towards the axis X and are returned resiliently to their resting position when the hooks 73 arrive in the flared end part of the portion 18. The collar 69 then abuts the lower edge of the portion 18, and the bearing 15 is thus stopped relative to the cover tube 11, in its axial position of normal operation.

As will be explained hereinafter, the mounting of the drive shaft 13 and the bearing 15 inside the cover tube 11 has to be carried out before the tool 5 is secured to the machine body 3.

Once the tool has been assembled in that manner, the user can mount the tool 5 on the machine body 3.

In order to do that, he inserts the end-piece 17 axially into the bore 31. When the end-piece 17 enters the bore 31, the hooks 25 come into contact with the outer rim 35, which causes the arms 21 to bend towards the axis X. When the insertion of the end-piece 17 into the bore 31 is continued, the upper end of the end-piece 17 bears on the elastomeric cover 61, with the undulations 26 and 63 being complementary with one another in terms of shape, and compresses it slightly, while the hooks 25 fall into the annular groove 33, which causes the arms 21 to return resiliently to their resting position. If insertion is continued, the annular shoulder 28 of the collar 27 abuts the rim 35 of the machine body 3. Under the effect of the resilient reaction of the elastomeric block 61 on the end-piece 17, the hooks 25 are laid in the groove 33 in their abutment position. The tool 5 is thus immobilised axially relative to the body 3.

The elastomeric block 61 more generally performs functions of compensation for axial clearance, absorption of vibration, and electrical insulation, in particular relative to the screws 53.

It also performs a sealing function and has a shape provided to facilitate the cleaning thereof. Thus, it contributes to an improvement in the hygiene of the machine.

Owing to the complementary undulations 26, 63 of the end-piece portion 19 and of the block 61, respectively, the block 61 also provides, by friction and by resilient return, an anti-rotation effect in respect of the tool 5 relative to the machine body 3.

By way of example, the elastomeric block 61 could be moulded from a material such as polyurethane.

At the end of the operation of mounting the tool 5 in the machine body 3, which has just been described, the assembled configuration shown in FIGS. 1 and 2 is arrived at.

As shown in those Figures, in that configuration the respective drive forms 43, 45 of the motor shaft 41 and of the drive shaft 13 are coupled over a length l called the "drive length".

It will also be appreciated that the flexible tongues 71 of the bearing 15 are engaged on the cylindrical end wall 55 of the locking member 47: the internal wall of a tongue 71 covers, over a length L called the "interference length" the external face of the cylindrical wall 55, preferably without contact but with a very small space. In the example shown, the internal face of each flexible tongue 71, at least in the vicinity of the free end, belongs to a cylindrical imaginary surface which is coaxial with the ring 65 and which has substantially the same diameter, being larger than the outside diameter of the cylindrical wall 55 of the locking member 47. It is agreed that the diameter of the imaginary surface means the diameter of that imaginary surface defined by the tongues 71 when they are in their resting position.

The cylindrical wall 55 of the locking member 47 is rigid (having a bending stiffness much greater than that of the tongues 71) and therefore, in the position of complete mounting of the bearing 15 in the cover tube 11 and of the tool in the body 3, blocks the bending clearance of the tongues 71. The member 47 thus prevents the unlatching of the means for securing the bearing to the cover tube.

When the machine is in operation, and in that position of complete mounting, there is therefore no risk that the drive shaft 13 will be subject to inadvertent dismounting.

In the embodiment which has just been described:
the axial length of the cylindrical wall 55 is greater than the interference length L;
the flexible tongues 71 and their hooks 73 are arranged in such a manner that their bending clearance, during insertion into the portion 18, is of an amplitude greater than the spacing between, on the one hand, the imaginary surface defined by the internal face of the tongues 71, and, on the other hand, the external surface of the cylindrical wall 55;
in the position of complete mounting, the upper end of the portion 18, and the external surface of the wall 55 have a relative arrangement which blocks the passage between them, in the axial direction, of the free end of the tongues 71.

It will be appreciated that, in order to dismount the tool 5 from the machine body 3, starting from the position shown in FIGS. 1 and 2, a user has only to press the buttons 23 of the sleeve 17, in order to withdraw the hooks 25 from the groove 33, and to disengage the cover tube 11 from the bore 31 by axial withdrawal.

Figure 7:
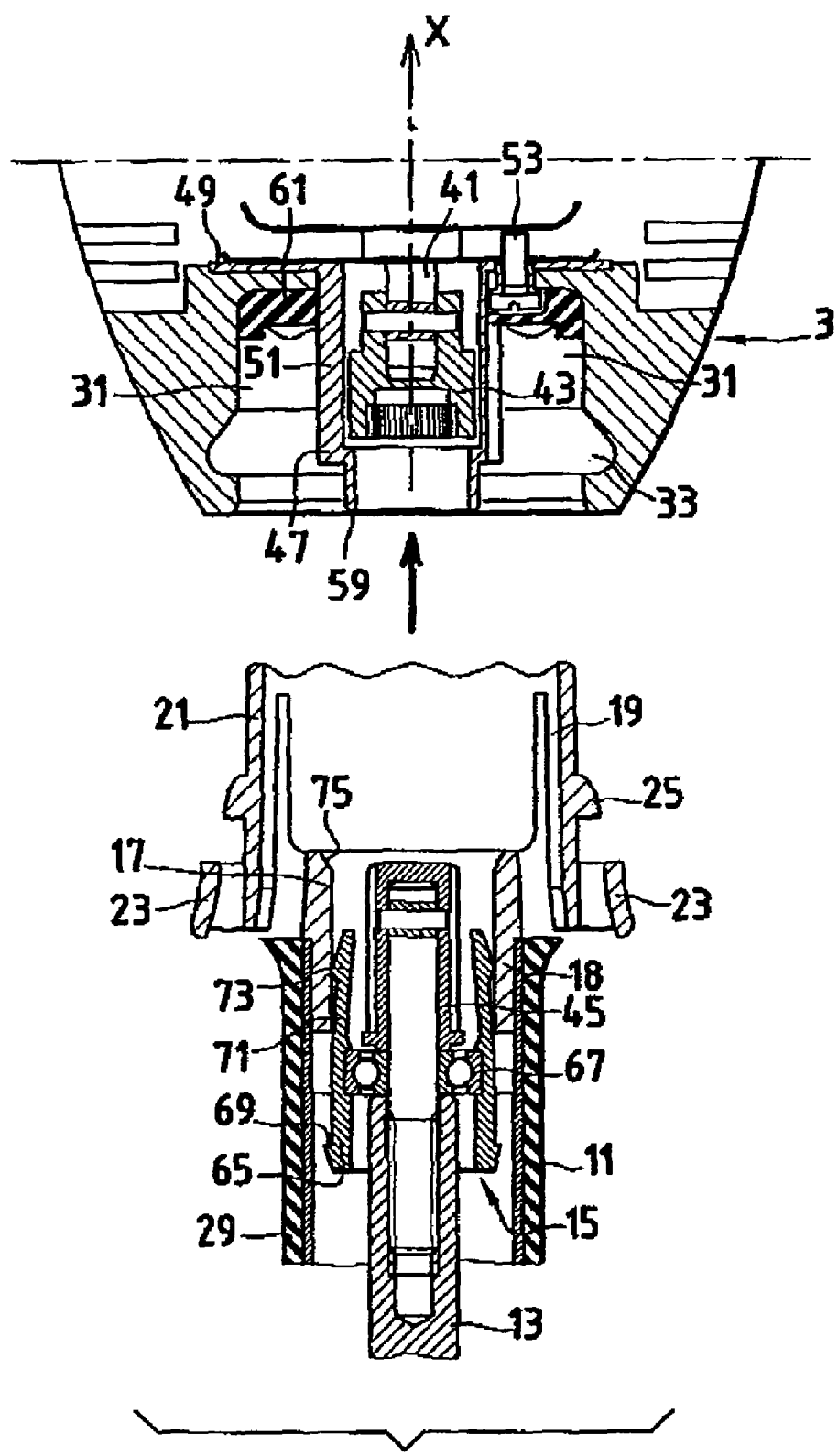
FIG. 7 is a view analogous to FIG. 1 in the position of incomplete securing of the centering and guiding member in the cover tube, and in the dismounted position of the cover tube relative to the machine body.

Referring to FIG. 7, a description will now be given of a situation of incomplete mounting of the bearing 15, together with the drive shaft 13, inside the cover tube 11.

In such a configuration, the bearing 15 is, for example, introduced incompletely into the portion 18 of the end-piece 17, so that the flexible tongues 71 are held in a position bent towards the axis X. When a user attempts to mount the tool 5 on the machine body 3, the free ends of the tongues 71 are not sufficiently spaced from the insertion axis X to slide on the external surface of the cylindrical end wall 55 of the locking member 47. Those free ends abut the stop edge 59 of the locking member 47. The result is that the user cannot normally continue the insertion of the end-piece 17 into the bore 31 and cannot arrive at the position in which the hooks 25 are latched into the groove 33. If he applies force to reach that position in which the end-piece is latched into the bore, the user will cause additional withdrawal of the drive shaft, which is pushed partially out of the cover tube 11. This clear withdrawal gives a visual indication to the user that the drive shaft has been incorrectly mounted in the cover tube.

Owing to the fact that the drive length l is smaller than the interference length L, the drive forms 43, 45 are not at any time engaged in such a case of incomplete mounting of the bearing 15 in the cover tube 11.

Thanks to that arrangement, even if the electrical motor is supplied with power to set the motor shaft 41 in rotation, the rotational movement cannot be transmitted to the drive shaft 13 if the latter is not engaged completely with its bearing 15 in the cover tube 11. This provides increased safety for the user and prevents the drive forms 43, 45 from being destroyed.

It will also be appreciated that the locking member 47 prevents the shaft 13 and the bearing 15 from being mounted in the cover tube 11 after the cover tube has been latched onto the body 3. If the cover tube 11 is latched onto the body 3 in the absence of the drive shaft 13 and the bearing 15, the insertion of the bearing 15 together with the shaft 13 into the portion 18 is arrested owing to the fact that the free ends of the bent tongues 71 abut the stop edge 59 of the locking member 47.

There, too, it will be appreciated that this arrangement renders safe the handling of the drive shaft 13 and its cutting member by the user, if the user were tempted to mount the shaft in the cover tube during the rotation of the motor shaft 41.

The invention claimed is:

1. A machine for processing food products, comprising a body and a tool which can be secured in a dismountable manner to the body, the tool comprising a cover tube, and a shaft for driving in rotation a member for processing the products, which shaft is mounted in the cover tube, wherein the body defines an axial bore which is to receive a first end portion of the cover tube and which is provided with a shoulder, wherein the cover tube is provided at a first end with dismountable means for latching onto a machine body, which means comprise, at the first end, at least one flexible axial resilient arm which is provided with a hook which can cooperate with the complementary shoulder of the body, in such a manner as to form a snap-in connection, and wherein cover tube has, at the first end, a plurality of axial projections distributed in a peripheral manner, the machine further comprising a block of resilient material interposed between the base of the bore of the body and the first end of the cover tube, when the cover tube is latched onto the body, the block having a bearing face for the first end of the cover tube, said face having axial recesses which are substantially complementary with the axial projections of the cover tube.

2. A machine according to claim 1, wherein the axial projections are constituted by undulations formed on the first end portion of the cover tube.

3. A machine according to claim 2, wherein the block is of a cylindrical general shape, one of the end faces having axial undulations which are complementary with those of the cover tube and which define the axial recesses.

4. A machine according to claim 1, wherein the block is arranged to be deformed in compression during the snapping-in of the latching means on the machine body.

5. A machine according to claim 1, wherein the shoulder is defined by an annular groove leading into the bore.

6. A machine according to claim 1, wherein the means for latching the cover tube onto the machine body comprise a pair of diametrically opposed axial resilient arms.

7. A machine according to claim 1, wherein the cover tube comprises a main tube, and an end-piece secured in a non-dismountable manner to one end of the main tube, the end-piece being provided with the means for latching the cover tube onto the machine body.

8. A machine according to claim 7, wherein the main tube is produced from metal and the end-piece is produced from plastics material.

* * * * *